March 13, 1934. A. H. DISTELI 1,951,254
ELECTROOPTICAL TESTING DEVICE FOR ACOUSTIC SIGNALS AND SOUNDS
Filed Oct. 1, 1932
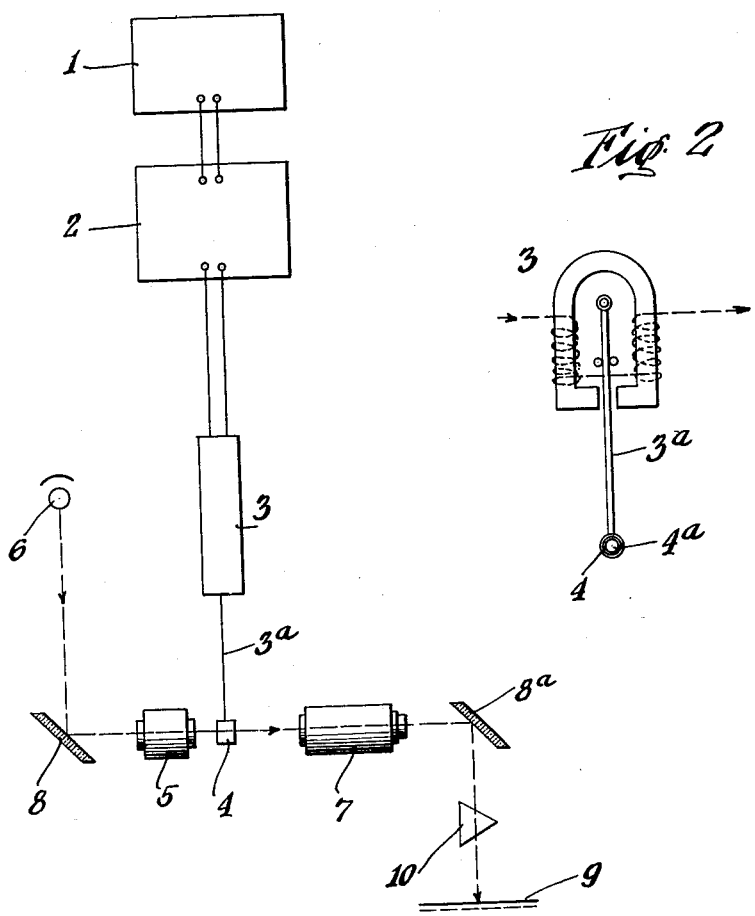
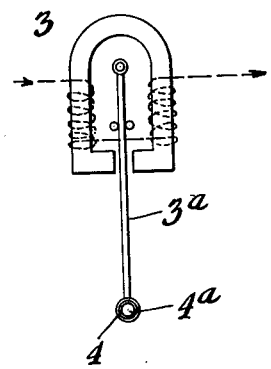

Patented Mar. 13, 1934

1,951,254

UNITED STATES PATENT OFFICE 1,951,254

ELECTROOPTICAL TESTING DEVICE FOR ACOUSTIC SIGNALS AND SOUNDS

Alfred H. Disteli, Olten, Switzerland, assignor to Ernst Leitz, Optische Werke, G. m. b. H., Wetzlar, Germany Application October 1, 1932, Serial No. 635,754 In Switzerland October 6, 1931

1 Claim. (Cl. 179—100.3)

This invention relates to an electro-optical testing device for acoustic signals, sounds, or the like, and it is the principal object of my invention to provide a device for producing a positively true reproduction of the sound waves in form of light signs or curves.

With the known devices for electrically testing acoustic signals or sounds, the sound waves are received or taken up by a microphone, and transformed within an amplifier into electric oscillations which are employed to energize any suitable electro-magnetic system, which is used to impart a swinging motion to a mirror, or movable prism by the intermediary of a suitable system of levers.

Various ways have been devised to record sound waves but all the apparatus used for this purpose have been more or less devised for laboratory uses only and were absolutely useless for practical purposes in the industries as they were too difficult to handle. So far no electromagnetic systems are known which reproduce weak and strong sounds or noises in a satisfactory manner by purely mechanical means for the reason that through the mechanical operation of the mirror or prism the end result became always inaccurate and, therefore, lost its value.

According to the present invention using an electromagnetic oscillating system electrically influenced by the sound waves, I provide the oscillating member of this system with an optical element (a lens or prism) which causes a light ray bunch coming from a condenser to wander across a registering or indicator face corresponding to the oscillations of the oscillating member. In this manner the sound waves to be tested will optically show more or less pronounced deviations during their wanderings across the registering plane allowing the optical recording or indication of hardly perceivable signals or sounds.

I entirely avoid the use of mechanical transmission means and obtain an absolutely true or accurate reproduction of the sound waves in form of light signs or curves.

The delicate and fine construction of my device is particularly well adapted for the control of the accuracy of clock-work motion so as to allow an accurate preliminary or final regulation of clocks by the inspection of the curve pictures.

These and other objects of my invention will become more fully known as the description thereof proceeds, and will then be more specifically defined in the appended claim.

In the accompanying drawing forming a material part of this disclosure:

Fig. 1 is a diagrammatic view of a device constructed according to my invention.

Fig. 2 is a front elevation of an electromagnetic oscillator with lens and holder according to my invention.

As illustrated, 1 designates a microphone for the reception of the signals, sounds, etc., to be tested, as for instance the escapement sounds of a clock. The microphone 1 is connected with an electrical amplifier 2 transmitting the amplifier currents to an electromagnetic oscillator system 3. The pendulum member 3a of which is extended and carries at its end a lens holder 4 carrying a small lens 4a located within the oscillating plane of the member 3a. From a source of light 6, a condenser 5 receives a bunch of light rays which through the intermediary of the lens 4a reaches the objective 6. The light coming from the objective 7 is transmitted by means of the mirror 8a to a turning mirror 10 from which the bunch of light rays coming from the objective receives a wandering motion across a registering plane or face 9 of more or less deviation according to the oscillation of the lens 4a.

The registering face or plane 9 is preferably provided with a graduated scale or forms part of a camera.

The lens 4a and the condenser 5 are exchangeably arranged and turned, and the objective 7 is exchangeable to suit the particular size of curves.

It will be clear that the lens 4a may be replaced by a prism within holder 4.

The condenser 5 and the objective 7 are suitably constructed and so arranged as to form an optical system which can be adjusted to suit the enlargement or decrease of the wanderings or measurement deviations without influencing the electromagnetic-oscillation system in any way. By selecting an appropriate combination of lenses in condenser and objective the light rays may best be utilized.

It will be understood that I have disclosed the preferred form of my device only as one example of the many possible ways to practically construct the invention, and that I may make such changes in the same as come within the scope of the appended claim without departing from the spirit of my invention and the principles involved.

Having thus described my invention, what I claim as new and desire to secure by Letters Patent is:

In an electro-optical testing device for acoustic signals, sounds, etc. a pendulum member, a lens holder carried by said pendulum member, a lens in said holder, a stationary condenser, and a stationary objective between which said lens is provided, and a movable mirror adapted to receive the light rays from the objective corresponding to the oscillations of the pendulum, a registering plane or face onto which the oscillations of the light rays are visibly transmitted from said mirror, the deviations of the wandering light rays from the normal upon said plane to provide a test for acoustic signals, and sounds and their deviations from the normal.

ALFRED H. DISTELI.